US011023939B2

(12) United States Patent
Schweitzer et al.

(10) Patent No.: US 11,023,939 B2
(45) Date of Patent: Jun. 1, 2021

(54) METHOD, DEVICE, AND COMPUTER-READABLE MEDIUM FOR SMART REFUELING EVENT MANAGEMENT

(71) Applicant: Verizon Patent and Licensing Inc., Arlington, VA (US)

(72) Inventors: David Harlan Schweitzer, Suwanee, GA (US); Dante J. Pacella, Charles Town, WV (US); John Gregory Bosque, Roswell, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 173 days.

(21) Appl. No.: 16/265,020

(22) Filed: Feb. 1, 2019

(65) Prior Publication Data

US 2020/0250720 A1    Aug. 6, 2020

(51) Int. Cl.
*G06Q 30/00* (2012.01)
*G06Q 30/06* (2012.01)
*G01C 21/36* (2006.01)
*B67D 7/22* (2010.01)
*G07C 5/00* (2006.01)

(52) U.S. Cl.
CPC ..... *G06Q 30/0611* (2013.01); *G01C 21/3679* (2013.01); *G06Q 30/0631* (2013.01); *G06Q 30/0635* (2013.01); *G06Q 30/0639* (2013.01); *G06Q 30/0643* (2013.01); *B67D 7/224* (2013.01); *G01C 21/3697* (2013.01); *G07C 5/004* (2013.01)

(58) Field of Classification Search
CPC . G06Q 30/0601–0645; G06Q 30/0611; G06Q 30/0631; G06Q 30/0635; G06Q 30/0639; G06Q 30/0643
USPC ............................................. 705/26.1–27.2
See application file for complete search history.

(56) References Cited

U.S. PATENT DOCUMENTS

| 2007/0288497 | A1* | 12/2007 | Droznin | G09B 29/007 |
| 2015/0106204 | A1* | 4/2015 | Pudar | G06Q 30/0269 705/14.58 |
| 2017/0178257 | A1* | 6/2017 | Tingler | G06K 19/07758 |

OTHER PUBLICATIONS

Looking for Cheaper Gasoline, Without the Drive. Jan. 26, 2011 (Jan. 26, 2011). New York Times Company. (Year: 2011).*

* cited by examiner

*Primary Examiner* — Allison G Wood

(57) ABSTRACT

A travel management platform can determine a refueling event for a vehicle, can identify a plurality of refueling stations based on the refueling event, can provide, to the plurality of refueling stations, one or more parameters for the refueling event, can receive respective offers for the refueling event, can select an offer for the refueling event from the respective offers for the refueling event, and can perform various actions, such as transmitting an instruction to autonomously navigate the vehicle to a refueling station associated with the offer for the refueling event, transmitting an instruction to display a notification associated with the offer for refueling event, transmitting information associated with the offer for refueling event, transmitting information associated with the refueling station associated with the offer for the refueling event, and/or the like.

20 Claims, 12 Drawing Sheets

METHOD, DEVICE, AND COMPUTER-READABLE MEDIUM FOR SMART REFUELING EVENT MANAGEMENT

BACKGROUND

Vehicles can generate a variety of indicators that provide various types of fuel information associated with the vehicle. For example, the vehicle can include a fuel gauge indicator that indicates an amount of fuel in a fuel tank of the vehicle, a range indicator that indicates an estimated number of miles the vehicle can travel before having to refuel, and/or the like.

DETAILED DESCRIPTION OF PREFERRED EMBODIMENTS

Figure 1A:
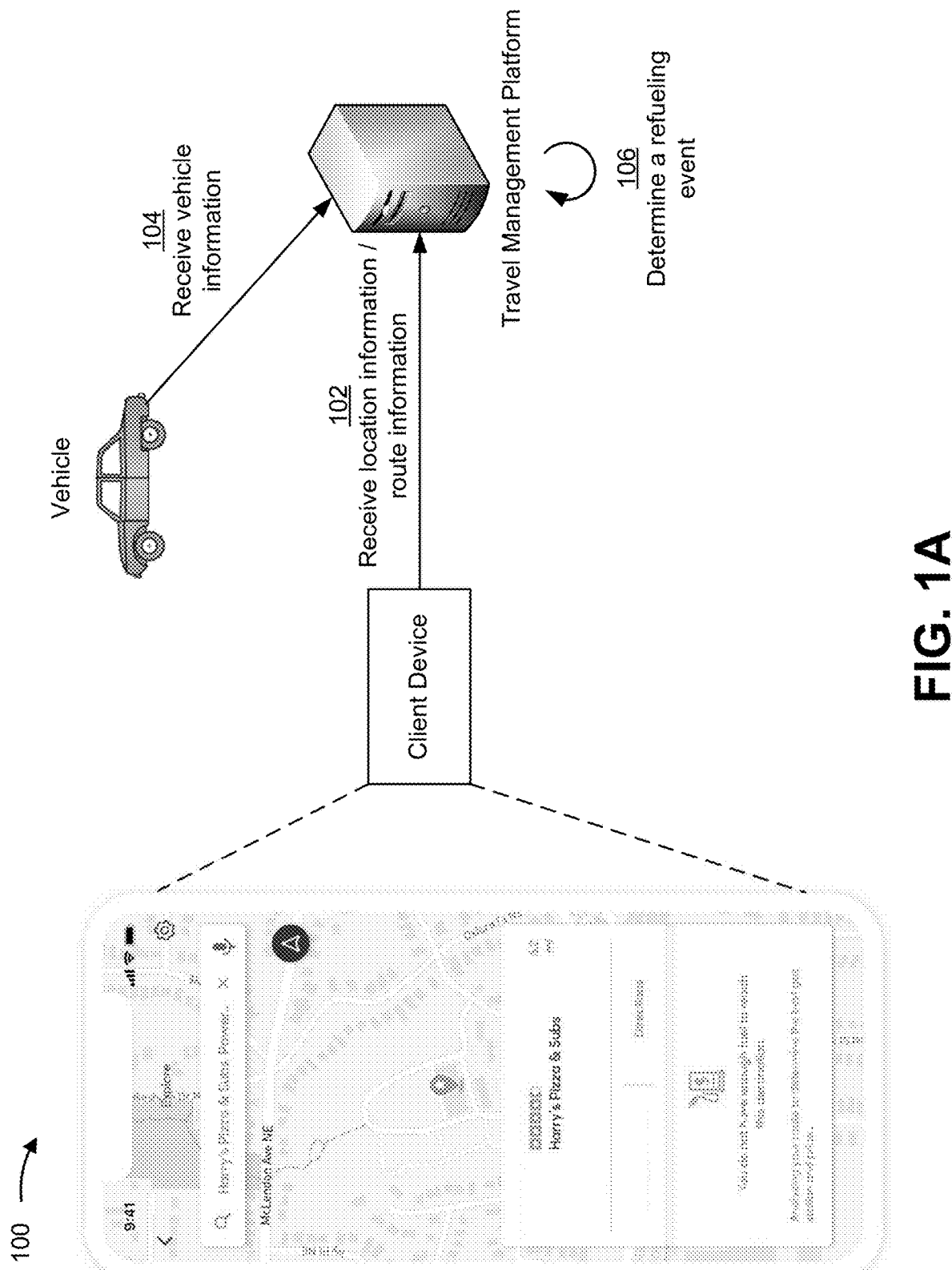
FIGS. 1A-1I are diagrams of an example implementation described herein.

The following detailed description of example implementations refers to the accompanying drawings. The same reference numbers in different drawings can identify the same or similar elements.

To determine when and where to refuel a vehicle, a user can use various applications and/or websites to identify refueling stations, prices offers by the refueling stations, and/or the like. The refueling stations are typically identified at a time when the vehicle is close to needing refueling. However, there is no means by which a user can indicate future demand, for refueling the vehicle, to refueling stations along a route. In some cases, a user can use a telephone to call around to candidate refueling stations and can try to negotiate the purchase of fuel at the candidate refueling stations ahead of time. However, this process is time consuming and does not provide a means for securely managing the negotiations across a plurality of refueling stations with traceability.

Some implementations described herein provide a travel management platform that is capable of providing smart refueling event management for a vehicle. In some implementations, the travel management platform can determine a refueling event, for a vehicle, along a route, and can indicate fuel demand, for the vehicle, to a plurality of refueling stations near the refueling event. The travel management platform can automatically negotiate with the plurality of refueling stations for offers for the refueling event. The travel management platform can securely manage the process of obtaining the offers for the refueling event by orchestrating the process via a distributed ledger or blockchain. In this way, the travel management platform reduces the amount of wasted computing resources and networking resources in obtaining the offers for the refueling event by eliminating the need for the user to search through multiple websites and/or applications to find which refueling stations offer the correct type of fuel for the vehicle, which refueling stations offer the best fuel prices, and which refueling stations offer other amenities that the user can want to take advantage of, which refueling stations can accommodate the type of vehicle, and/or the like. As millions of vehicles become managed by the travel management platform, the computing resource, memory resource, and networking resource savings becomes significant.

FIGS. 1A-1I are diagrams of an example implementation 100 described herein. As shown in FIGS. 1A-1I, implementation 100 can include various devices, such as a client device, a vehicle that can be associated with a vehicle device, a plurality of refueling station devices, a fleet management device, a travel management platform, and/or the like.

In some implementations, the client device can be a device associated with a user and the vehicle. In some implementations, the client device can be a device capable of communicating with the travel management platform to receive refueling event information. The client device can include a display to display the refueling event information, can include a speaker to provide the refueling event information via audio, and/or the like. In some implementations, the client device can transmit various types of information to the travel management platform. For example, the client device can transmit location information associated with the client device (which can be used as a proximate indicator of the location of the vehicle), route information associated with a route that the vehicle is traveling or is to travel, and/or the like.

In some implementations, the location information associated with the client device can include information identifying the current location of the client device, information identifying one or more previous locations associated with the client (referred to as historical location information), an& or the like. The location information can include world geodetic system (WGS) coordinates associated with the client device's geographical location, coordinates associated with client device's geographical location expressed in another coordinate system, and/or the like. In some implementations, the route information can include information identifying a destination associated with a route, information identifying one or more turn-by-turn navigation directions associated with the route, information identifying one or more roads included in the route, and/or the like.

In some implementations, the vehicle device can include an onboard diagnostics (OBD) device or another type of sensor device that can collect and transmit vehicle information associated with the vehicle. The vehicle information can include various types of information, such as information identifying a fuel type or combination of fuel types associated with the vehicle (e.g., gasoline, diesel, flex fuel, electric, hydrogen, and/or the like), information identifying a fuel capacity of the vehicle (e.g., in gallons, liters, wattage, and/or the like), information identifying a fuel level of the vehicle (e.g., a quantity of fuel remaining, a percentage of the fuel capacity remaining, and/or the like), information identifying a fuel usage of the vehicle (e.g., a fuel economy of the vehicle expressed in an average miles per unit of fuel), information identifying a fuel range of the vehicle (e.g., in miles or kilometers of travel remaining based on the fuel level of the vehicle), information identifying a make, model, and year of the vehicle, and/or the like.

In some implementations, respective refueling station devices, of the plurality of refueling station devices, can be associated with respective refueling stations. A refueling station device can include a device that can be capable of receiving, or accessing via a distributed ledger or blockchain, one or more parameters for a refueling event, that can be capable of generating an offer for the refueling event, that can be capable of transmitting the offer for the refueling event, and/or the like.

In some implementations, a refueling station can include a gas station, a charging station, and/or any other type of commercial location that offers refueling services. In some implementations, a refueling event can include the refueling of the vehicle at a refueling station. In some implementations, other goods and/or services can be offered and consumed in a refueling event, such as the purchase of food and/or other goods and/or services.

In some implementations, an offer for a refueling event can include an offer, associated with a refueling station, to refuel the vehicle at the refueling station. The offer can include various aspects, such as an offer of a particular price per unit of fuel, can include various types of discounts and/or offers for the fuel and/or other goods and/or services, can include refueling station rewards offers and/or discounts, vehicle fleet offers and/or discounts, and/or the like. In some implementations, a refueling station can determine an offer for a refueling event based on various factors, such as an amount of fuel that is expected to be purchased during the refueling event, other goods and/or services the user is expected to purchase during the refueling event, a frequency that the user refuels at the refueling station (or other refueling stations of the same brand or commercial entity), an amount that the user typically spends when refueling the vehicle, a rewards program status of the user, the vehicle fleet in which the vehicle is included, whether there are other refueling stations near the refueling station, the quantity of other refueling stations near the refueling station, and/or the like.

In some implementations, the one or more parameters for a refueling event can include a fuel type associated with the vehicle, an amount of fuel that is expected to be purchased as part of the refueling event, one or more user preferences associated with the user (e.g., an indication that the user wants to purchase food or other goods during the refueling event), refueling station rewards information (e.g., information identifying a membership number or identifier, information identifying a rewards balance, and/or the like), fleet information associated with the vehicle (e.g., information identifying a particular commercial or business vehicle fleet in which the vehicle is included), a time window in which the refueling event is expected to occur, a quantity of other refueling events, along the route that the vehicle is to travel, that is estimated for the vehicle (e.g., an indication that the vehicle is expected to make three stops to refuel and the associated time windows and locations), and/or the like.

In some implementations, the fleet management device can include a device that is capable of providing a user interface (e.g., a graphical user interface (GUI)) for managing a vehicle fleet associated with a business or another type of commercial entity. In some implementations, a fleet manager or another user can use the user interface of the fleet management device to view fleet information associated with the vehicle fleet, to manage the vehicle fleet, and/or the like.

In some implementations, the fleet information can include information identifying a plurality of vehicles included in the vehicle fleet, can include information identifying respective users associated with respective vehicles of the plurality of vehicles, can include route information associated with the plurality of vehicles, can include fuel information associated with the plurality of vehicles, can include refueling event information associated with the plurality of vehicles, and/or the like. In some implementations, the fleet manager or other user can use the user interface provided by the fleet management device to schedule a route for a vehicle included in the vehicle fleet, schedule refueling events for the vehicle, schedule a driver for the vehicle, and/or the like.

In some implementations, the travel management platform can determine refueling events for the vehicle, can automatically interact with the plurality of refueling station devices to negotiate offers for the refueling events, can store and retrieve information associated with the refueling events, can provide information and/or instructions to the client device, can provide information and/or instructions to the fleet management device, can provide information and/or instructions to the vehicle device, and/or the like.

As shown in FIG. 1A, and by reference number 102, to determine a refueling event for the vehicle, the travel management platform can receive the location information associated with the client device and the route information associated with the route that is being traveled or is to be traveled by the vehicle. In some implementations, the client device can transmit the location information and/or the route information. In some implementations, another device, such as a navigation platform, global positioning system (GPS) device, and/or the like, can transmit the location information and/or the route information.

In some implementations, the client device can transmit the location information and the route information based on the client device determining the route, can transmit the location information and the route information at particular time intervals, and/or the like. In some implementations, the client device can determine the route based on receiving input specifying a destination and determining the route between the location of the client device (and thus the vehicle) and the destination. The input specifying the destination can include input received from the user interacting with the client device, can be received from the fleet management device, and/or the like.

As shown by reference number 104, the travel management platform can receive, from the vehicle device, the vehicle information associated with the vehicle. In some implementations, the travel management platform can receive the vehicle information at particular time intervals, can receive the vehicle information based on transmitting, to the vehicle device, a request for the vehicle information, and/or the like. In some implementations, the travel management platform can transmit the request, for the vehicle information, based on receiving the location information and the route information from the client device.

As shown by reference number 106, the travel management platform can determine a refueling event for the vehicle. In some implementations, the travel management platform can determine the refueling event based on the location information, the route information, the vehicle information, and/or the like. For example, the travel management platform can determine that the vehicle will need to refuel before reaching the destination of the route based on vehicle's location along the route, based on an amount of fuel remaining in the vehicle, and base on a fuel economy of the vehicle. The travel management platform can determine a location, along the route, at which the refueling event is predicted to be needed, can determine an estimated portion of the route (e.g., a 5-mile stretch of the route, a 10-mile radius along the route, and/or the like) in which the refueling event can be needed, and/or the like. In some implementations, the travel management platform can determine the predicted location of the refueling event based a specified distance (e.g., user-specified, fleet manager-specified, and/or the like), along the route, before the vehicle is expected to run out of fuel.

In some implementations, the travel management platform can determine the refueling event based on receiving an instruction (e.g., from the client device, from the fleet management device, and/or the like) to determine the refueling event for the vehicle. For example, a user or fleet manager can instruct the travel management platform to determine the refueling event in a particular geographic area, such as a city or town, which can be prior to the refueling event being needed. This can occur, for example, if the user intends to stay overnight in a particular city, if the user intends to sightsee in a particular area, and/or the like.

In some implementations, the travel management platform can transmit, to the client device, an instruction to display a notification of the refueling event. For example, and as shown in FIG. 1A, the notification can include an indication that a refueling event is predicted to be needed in order for the vehicle to completely traverse the route identified in the route information. In some implementations, the notification can include a visual indication (e.g., a point on a map along the route identified in the route information) of the location or estimated portion of the route at which the refueling event is predicted to be needed. In some implementations, the notification can include an indication that the travel management platform has initiated a process to identify one or more offers for the refueling event. In some implementations, the notification can include a request for approval, from the user, for the travel management platform to initiate the process to identify one or more offers for the refueling event. The request for approval can include a request to select a button on the user interface, a request for a voice input that indicates approval, and/or the like.

In some implementations, the travel management platform can determine a plurality of refueling events for the vehicle. For example, the travel management platform can determine that, based on the length of the route indicated in the route information, and based on an estimated fuel range of the vehicle, that the vehicle is predicted to need to be refueled a plurality of times in order to reach the destination of the route.

Figure 1B:
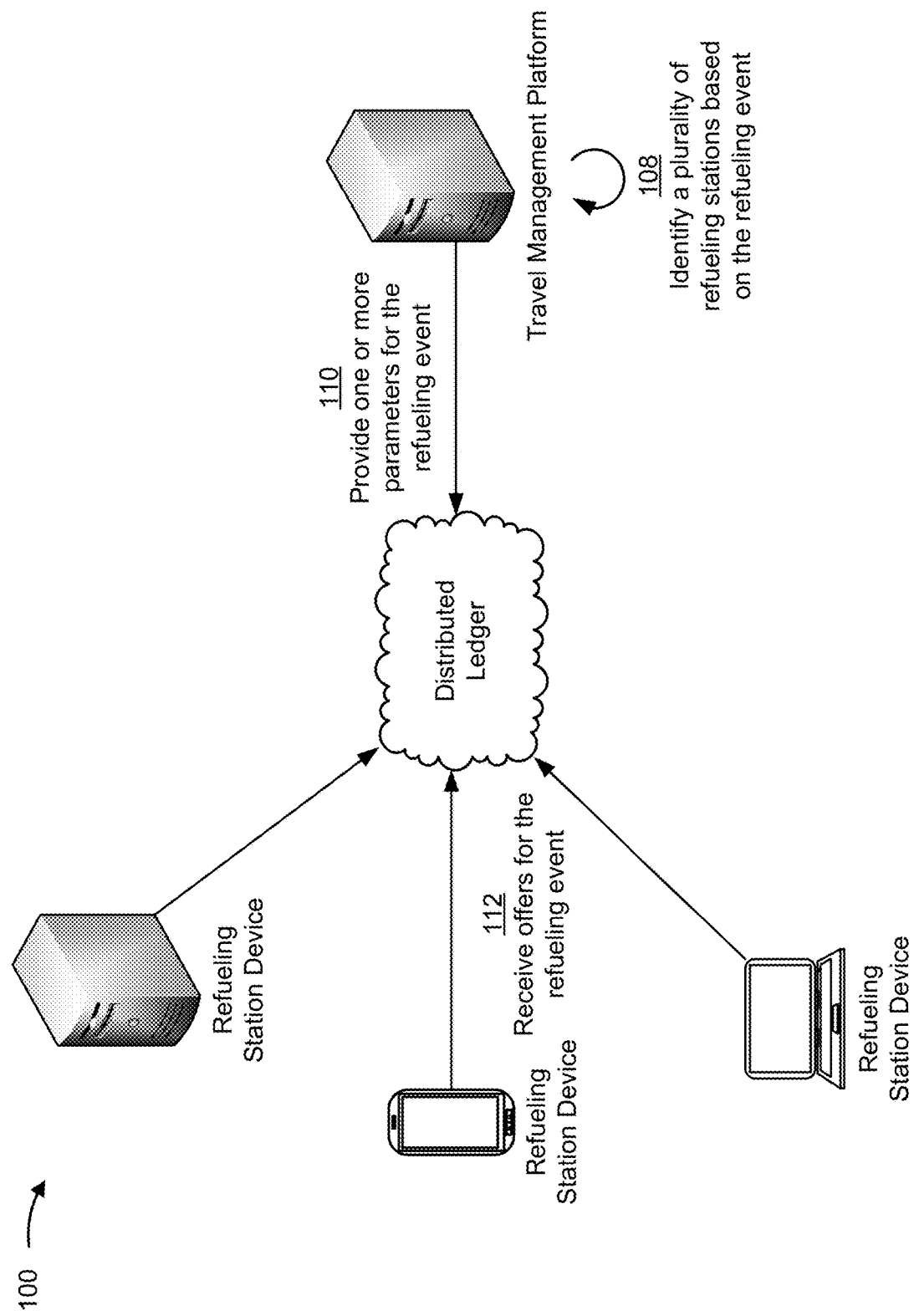

As shown in FIG. 1B, and by reference number 108, the travel management platform can identify a plurality of refueling stations based on the refueling event. In some implementations, the travel management platform can identify the plurality of refueling stations based on determining the refueling event, based on receiving an instruction (e.g., from the client device, from the fleet management device, and/or the like) to identify the plurality of refueling stations, and/or the like.

In some implementations, the travel management platform can identify the plurality of refueling stations based on the plurality of refueling stations being located proximate to the predicted location of the refueling event. For example, the travel management platform can identify the plurality of refueling stations based on the plurality of refueling stations being located in the same city at the predicted location of the refueling event. As another example, the travel management platform can identify the plurality of refueling stations based on the plurality of refueling stations being located within a threshold driving distance (e.g., one mile, five miles, and/or the like) of the predicted location of the refueling event. As another example, the travel management platform can identify the plurality of refueling stations based on the plurality of refueling stations being located near a highway exit that is near the predicted location of the refueling event, based on the plurality of refueling stations being located in the same city at the predicted location of the refueling event.

In some implementations, the travel management platform can identify the plurality of refueling stations based on one or more user preferences for identifying the plurality of refueling stations. The one or more user preferences can be received from the client device, from the fleet management platform, and/or the like, and can include a preference for refueling stations that are associated with a particular refueling station brand or commercial entity, a preference for a maximum amount of distance deviation from the route which the vehicle is traveling (or is to travel) (e.g., one mile in drivable distance from the route, five miles in drivable distance, and/or the like), a preference for a maximum amount of time deviation from the route which the vehicle is traveling (or is to travel) (e.g., travel to a particular refueling station is to add no more than 10 minutes to the time duration of the route and/or the like), and/or the like.

In some implementations, the travel management platform can identify the plurality of refueling stations based on the type of fuel associated with the vehicle (e.g., to identify refueling stations that offer diesel fuel), based on the plurality of refueling stations being capable of accommodating a vehicle type associated with the vehicle (e.g., being capable of accommodating the refueling of semi-trucks, being capable of accommodating the refueling of trucks of a particular height, and/or the like), and/or the like.

In some implementations, the travel management platform can negotiate, on behalf of the user and/or fleet manager, for offers from the plurality of refueling stations for the refueling event. As shown by reference number 110, to negotiate for offers for the refueling event, the travel management platform can provide, to the plurality of refueling stations, one or more parameters for the refueling event. The one or more parameters can include any of the parameters for refueling events, as indicated above.

In some implementations, the travel management platform can provide the one or more parameters to the plurality of refueling stations by transmitting the one or more parameters to respective refueling station devices associated with the plurality of refueling stations. In some implementations, the travel management platform can provide the one or more parameters to the plurality of refueling stations by storing the one or more parameters in a distributed ledger and can provide access to the distributed ledger to the refueling station devices. In this way, the refueling station devices can securely access the one or more parameters in the distributed ledger.

As shown by reference number 112, the refueling station devices can provide respective offers for the refueling event to the travel management platform. In some implementations, the refueling station devices can provide the respective offers for the refueling event by transmitting the respective offers for the refueling event to the travel management platform. In some implementations, the refueling station devices can provide the respective offers for the refueling event by storing the respective refueling offers in the distributed ledger such that travel management platform can securely access the respective refueling offers in the distributed ledger. In some implementations, an offer, of the respective offers for the refueling event, can include any of the aspects described above. In some implementations, a refueling station can specify that an offer for the refueling event is valid for a particular time duration (e.g., 12 hours, 24 hours, and/or the like), can specify that one or more aspects of the offer are valid for a particular time duration, and/or the like.

In some implementations, a refueling station can upload pricing data to the distributed ledger so that the refueling station can automatically generate an offer for the refueling event based on the uploaded pricing data. For example, the pricing data can be mapped to daily/weekly/monthly demands, loyalty programs, underground tank levels/delivery status for the particular fuel type indicated in the one or more parameters for the refueling event, weather forecast data, and/or other criteria that can gauge how competitive to make an auto-generated offer for the refueling event. In some implementations the pricing data can include a fixed price per unit of fuel, a percentage adjustment of a supplier price of the fuel, a percentage adjustment of a commodity price associated with the fuel type, and/or the like.

Figure 1C:
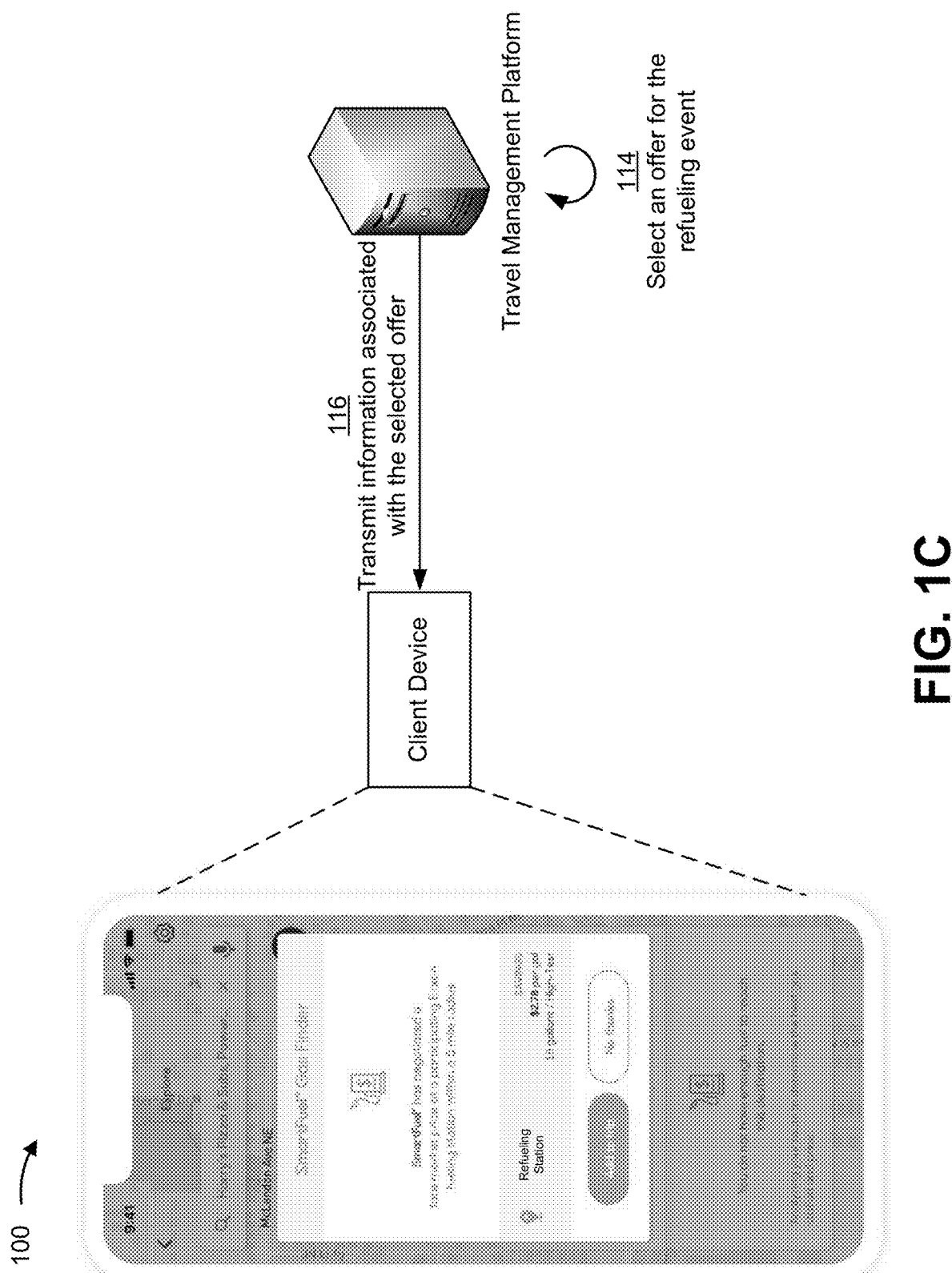

As shown in FIG. 1C, and by reference number 114, the travel management platform can select an offer for the refueling event from the respective offers for the refueling event. In some implementations, the travel management platform can automatically select the offer for the refueling event based on various factors. In some aspects, the travel management platform can autonomously select the offer based on the offer satisfying the one or more parameters, based on the offer satisfying a subset of the one or more parameters, and/or the like. In some implementations, the travel management platform can autonomously select the offer based on the offer being an offer with the lowest price per unit of fuel, based on the offer offering the greatest refueling station rewards benefit, and/or the like. In some implementations, the travel management platform can autonomously select the offer based on a combination of factors, such as the price per unit of fuel satisfying a threshold price per unit of fuel and offering the greatest refueling station rewards benefit.

As shown by reference number 116, the travel management platform can transmit information, associated with the selected offer for the refueling event, to the client device, and the client device can display the information associated with the selected offer. In some implementations, the travel management can further transmit a request for confirmation of the selected offer, which can also be displayed on the client device. In this way, the user can approve the selection of the offer or decline the offer so that the travel management platform can request additional and/or different offers for the refueling event.

In some implementations, instead of automatically selecting the offer, the travel management can select a plurality of candidate offers for the refueling event and can transmit, to the client device, information associated with the plurality of candidate offers. In this way, the user can select an offer from the plurality of offers for the refueling event.

Figure 1D:
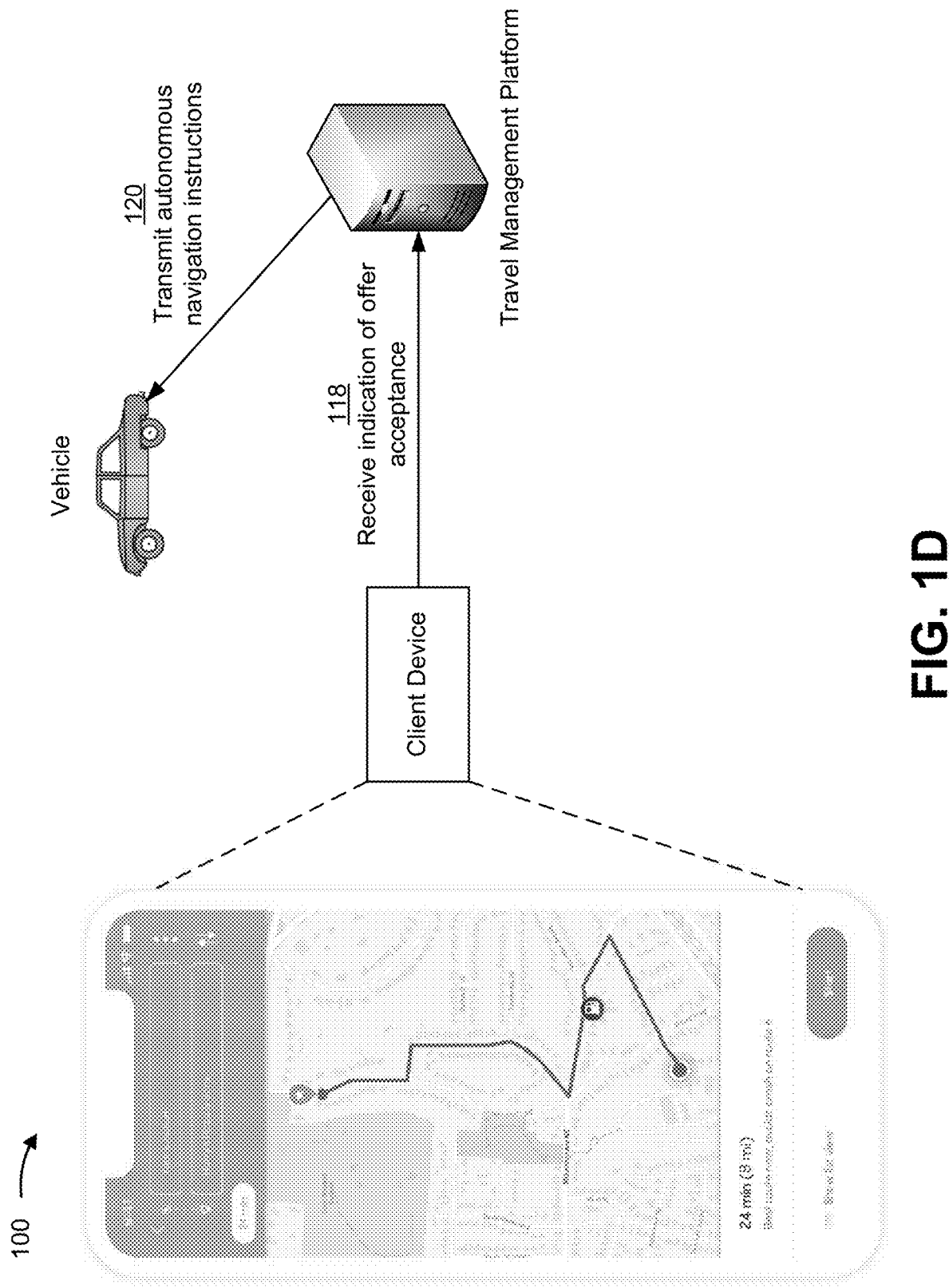

As shown in FIG. 1D, and by reference number 118, the travel management platform can receive an indication of acceptance of the offer for the refueling event. In some implementations, the indication of acceptance of the offer for the refueling event can be received from the client device, from the fleet management device, and/or the like. In some implementations, the client device can add the refueling station as an intermediate destination along the route that is being (or is to be) traversed by the vehicle.

In some implementations, upon receiving the indication of the acceptance of the offer, the travel management platform can generate a smart contract, between the user and the refueling station, for the refueling event at the refueling station. The travel management platform can store the smart contract in the distributed ledger. The smart contract can identify various aspects of the refueling event, such as the price per unit of fuel for the refueling event, refueling station rewards that are to be earned or redeemed for the refueling event, other goods and/or services that are to be purchased during the refueling event, and/or the like.

As shown by reference number 120, in some implementations, the travel management platform can automatically cause the vehicle (if the vehicle is equipped with autonomous or semi-autonomous driving capabilities) to navigate to the refueling station associated with the offer. For example, the travel management platform can periodically receive location updates from the client device, can determine that the client device (and thus the vehicle) is within a threshold distance of the refueling station, and accordingly can transmit autonomous navigation instructions to the vehicle based on the client device being located within the threshold distance of the refueling station. In this way, the travel management platform can automatically navigate the vehicle to the refueling station.

Figure 1E:
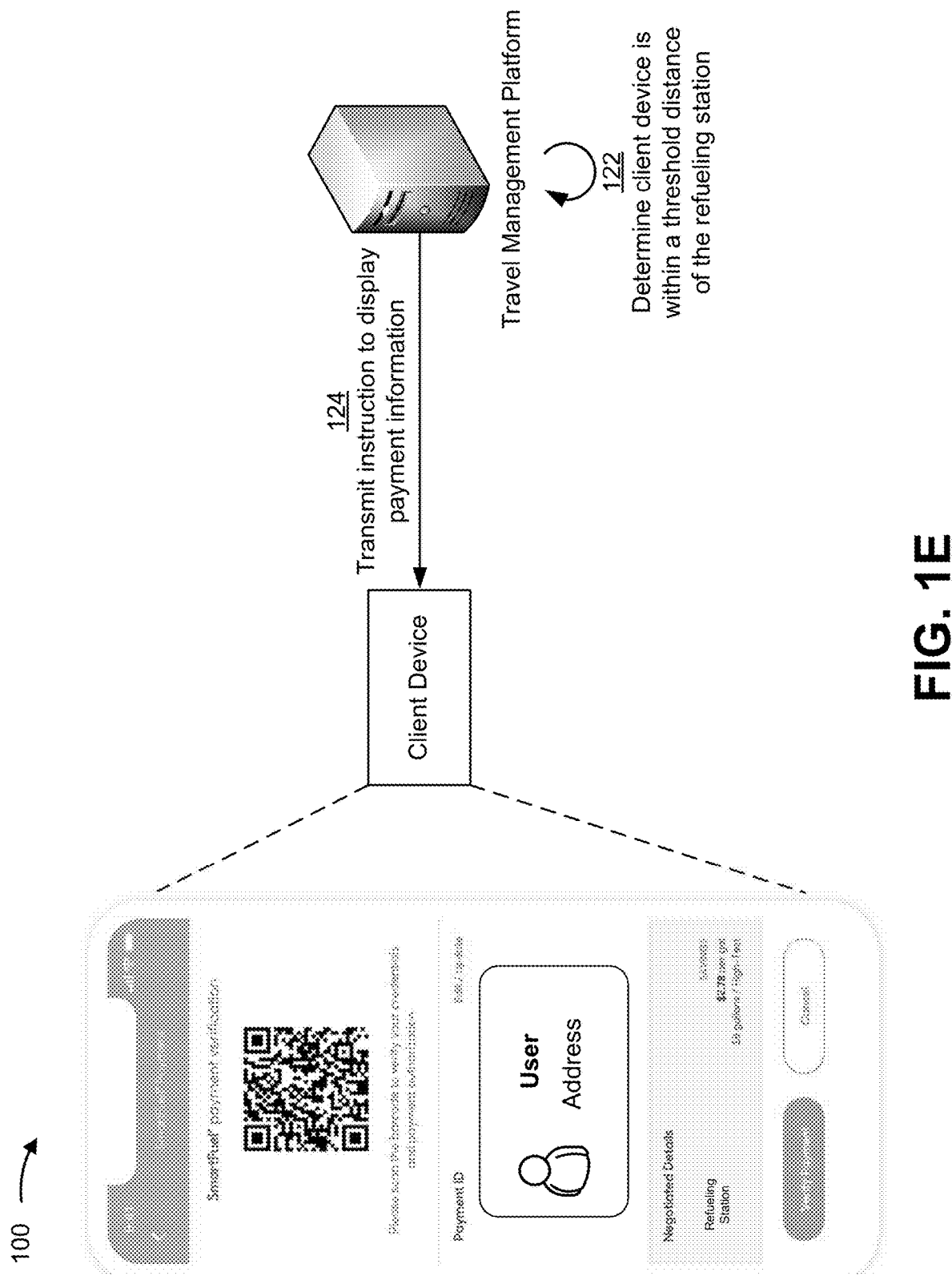

As shown in FIG. 1E, and by reference number 122, the travel management platform can determine whether the client device (and thus the vehicle) is within a threshold distance of the refueling station (which can be a different threshold distance than the threshold distance referred to above). The threshold distance can be a relatively small distance to the refueling station, such as 1000 feet, 300 feet, and/or the like. The travel management platform can use the threshold distance as an indication that the user is about to refuel the vehicle.

As shown by reference number 124, the travel management platform can transmit, to the client device, an instruction to display payment information associated with the refueling event. In some implementations, the travel management platform can transmit the instruction based on determining that the client device is within the threshold distance of the refueling station.

In some implementations, the payment information can include identification information associated with the user (e.g., a driver's license, another form of photo identification, and/or the like), can include credit card information (e.g., an image of the user's credit card, the user's credit card number, and/or the like), can include a barcode (e.g., a quick read (QR) code or another type of barcode) that is linked to a payment account associated with the user (e.g., a checking account, a cryptocurrency account, and/or the like), and/or the like. In some implementations, the client device can further display information associated with the refueling event, such as the price per unit of fuel, a fuel type, and/or the like. In some implementations, instead of, or in addition to, displaying the payment information, the client device can present the payment information via a near-field communication (NFC) signal, a Bluetooth signal, a Wi-Fi direct signal, and/or the like.

In some implementations, the user can use the payment information to initiate the refueling event. For example, the refueling station can prompt the user to scan the identification information and the payment information to verify the user's identity and payment information. Once the refueling station has verified the user's identity and payment information, the refueling station can permit the user to refuel the vehicle.

Figure 1F:
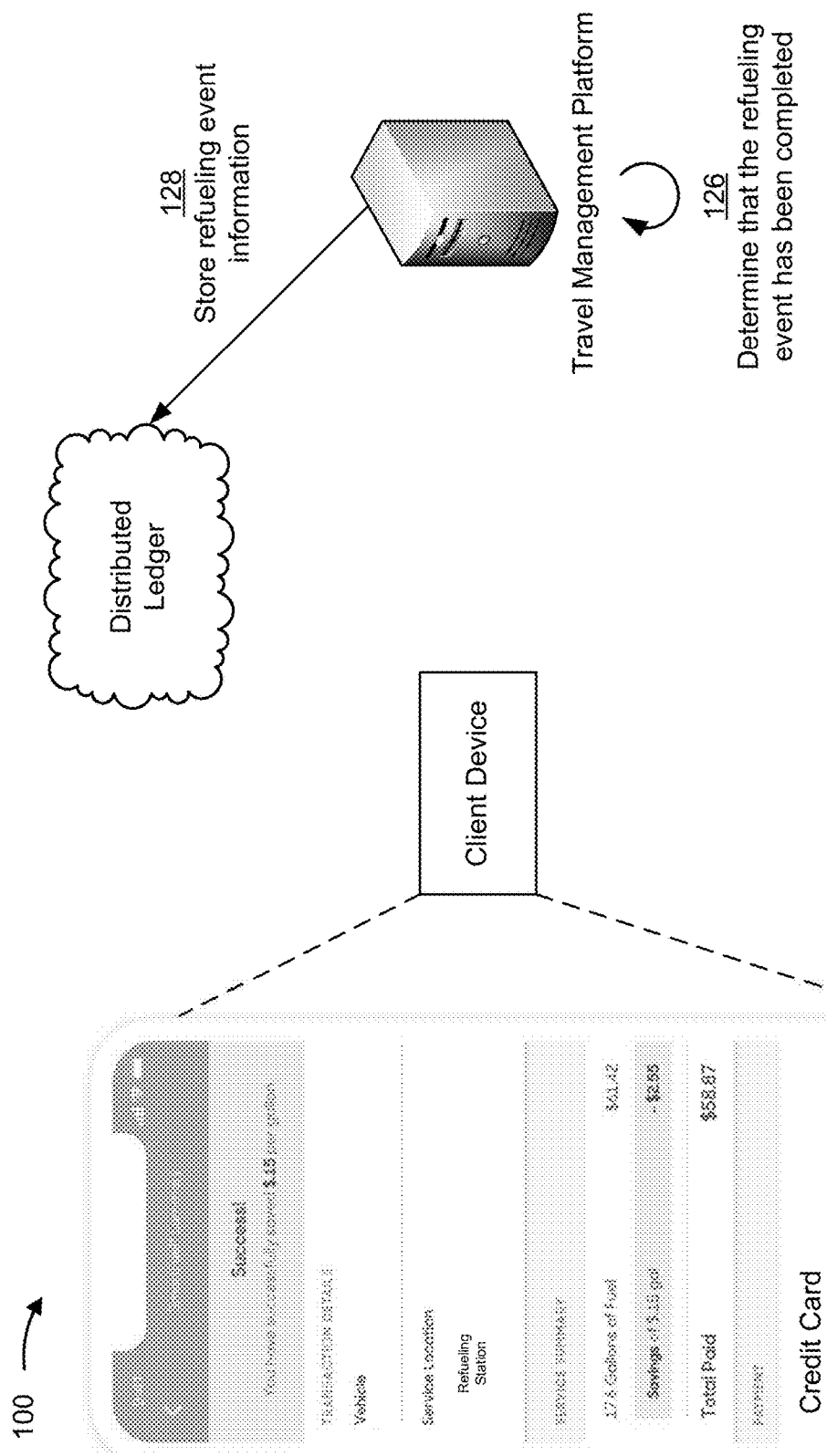

As shown in FIG. 1F, and by reference number 126, the travel management platform can determine that the refueling event has been completed. In some implementations, the travel management platform can determine that the refueling event has been completed based on receiving refueling event information associated with the refueling event. In some implementations, the refueling event information can include information identifying one or more aspects of the refueling event, such as a total amount of fuel that was purchased, a total price that was paid for the fuel, the payment method that was used, a price that was paid for other goods and/or services that were purchased during the refueling event, refueling station rewards that were earned and/or redeemed, an amount of savings that was realized as a result of the travel management platform negotiating with the plurality of refueling stations for the refueling event, a date and time the refueling event was completed, and/or the like.

The travel management platform can receive the refueling event information from the client device and/or the refueling station device associated with the refueling station. In some implementations, the travel management platform can receive the refueling event information from the client device and the refueling station device and can compare the refueling event information received from the client device, and the refueling event information received from the refueling station device. In this case, the travel management platform can determine whether the refueling event information received from the client device and the refueling event information received from the refueling station device are the same, completely match, and/or are otherwise consistent as a means to identify and prevent fraud, tampering with the refueling event transition, and/or other types of cyberattacks.

If the travel management platform determines that the refueling event information respectively received from the client device and the refueling station device are not consistent, the travel management platform can determine that the client device and/or the refueling station device has been attacked, corrupted, and/or otherwise compromised. Accordingly, the travel management platform can perform one or more actions to identify the source of the attack (e.g., performing one or more intrusion detection tests), can perform one or more actions to prevent the attack and/or corruption from affecting other devices (e.g., isolating the client device from the refueling station device), and/or the like.

As shown by reference number 128, if the travel management platform determines that the refueling event information respectively received from the client device and the refueling station device are consistent, the travel management platform can store the refueling event information in the distributed ledger. For example, the travel management platform can append the refueling event information to the smart contract that was generated for the refueling event.

Figure 1G:
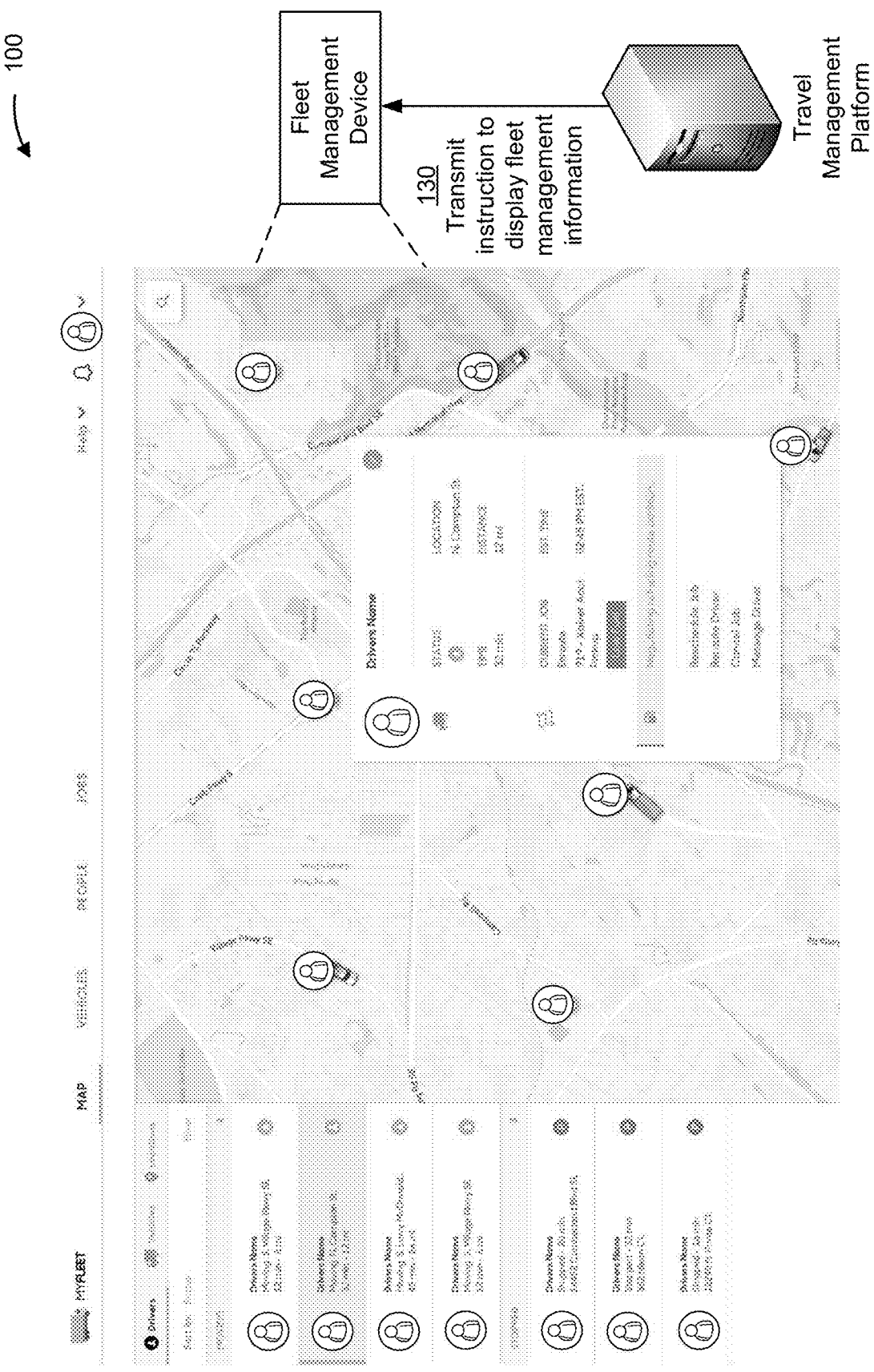

Turning to FIG. 1G, as explained above, in some implementations, the vehicle can be included in a vehicle fleet along with a plurality of other vehicles. As shown by reference number 130, the travel management platform can transmit, to the fleet management device, an instruction to display fleet information associated with the vehicle fleet. In some implementations, the fleet management device can display the fleet information in the GUI for managing the vehicle fleet.

In some implementations, the fleet information can include information identifying respective locations of the vehicles included in the vehicle fleet. The travel management platform can receive information identifying the respective locations from the vehicles included in the vehicle fleet (e.g., from respective client devices associated with the vehicles, from respective vehicle devices associated with the vehicles, and/or the like), and can provide, to the fleet management device, the information identifying the respective locations.

In some implementations, the fleet information can include information identifying a driver or user of a vehicle included in the fleet, can include information identifying a status of the vehicle (e.g., information identifying whether the vehicle is stopped or traveling, a time duration for how long the vehicle has been traveling, a fuel status of the vehicle, and/or the like), can include information identifying a destination of the vehicle and a route to the destination, can include information identifying a business purpose of the route, can include information identifying a refueling event history of the vehicle, and/or the like. In some implementations, the information identifying the refueling event history for the vehicle can include information identifying each refueling event in a particular time window, information identifying an amount paid for each refueling event in the time window, an amount of money saved as a result of the travel management platform negotiating for offers for the refueling event, a savings trend for the vehicle, and/or the like.

In some implementations, the fleet management device can enable a user or fleet manager to provide various inputs and/or instructions to manage the vehicle fleet. In some implementations, the fleet management device can automatically and/or autonomously manage the vehicle fleet by providing instructions to the travel management platform. For example, the fleet management device can determine that a vehicle, included in the vehicle fleet, is low on fuel and can automatically provide, to the travel management platform, an instruction to generate a refueling event for the vehicle. As another example, the fleet management device can determine that a road event (e.g., construction, an accident, and/or the like), a weather event, and/or the like can cause a delay in the travel of a vehicle included in the fleet, and accordingly can provide an instruction (e.g., to the client device and/or vehicle device associated with the vehicle) to generate an alternate route for travel to a destination location.

Figure 1H:
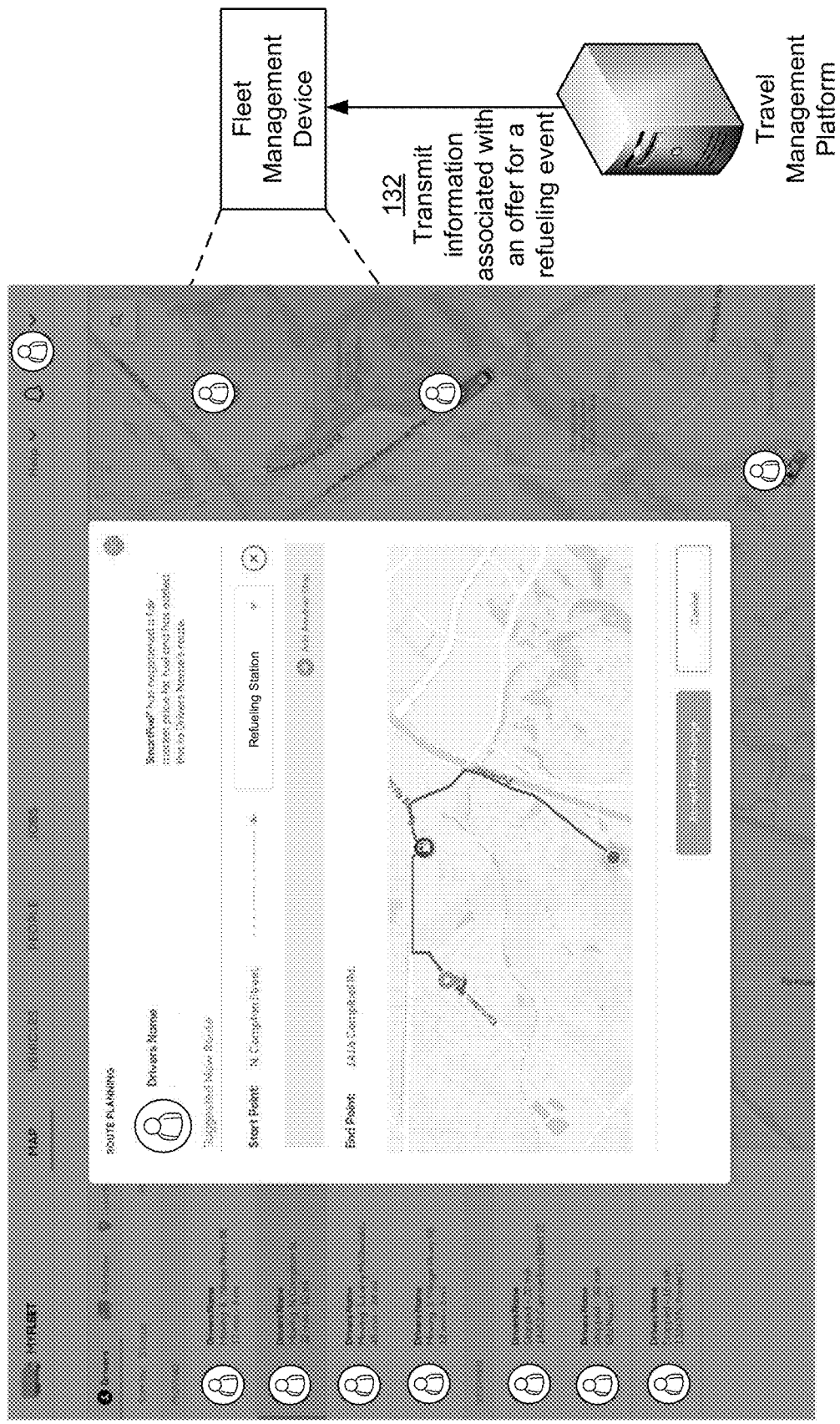

As shown in FIG. 1H, and by reference number 132, if the travel management platform determines a refueling event for a vehicle included in the vehicle fleet (e.g., based on receiving an instruction from the client device and/or the fleet management device, based on automatically determining the refueling event, and/or the like), the travel management platform can provide information associated with an offer for the refueling event. In some implementations, the information associated with the offer for the refueling event can include information identifying one or more offers for the refueling event, can include information identifying a selected offer for the refueling event, and/or the like. In some implementations, the fleet management device can automatically approve the offer for the refueling event, can display a request for input (e.g., via the GUI, via an audio notification, and/or the like) in order to approve the offer for the refueling event. If the fleet management device receives approval of the offer (or automatically approves the offer), the travel management platform can add the refueling station, associated with the offer, to the route that is being traveled (or is to be traveled) by the vehicle.

Figure 1I:
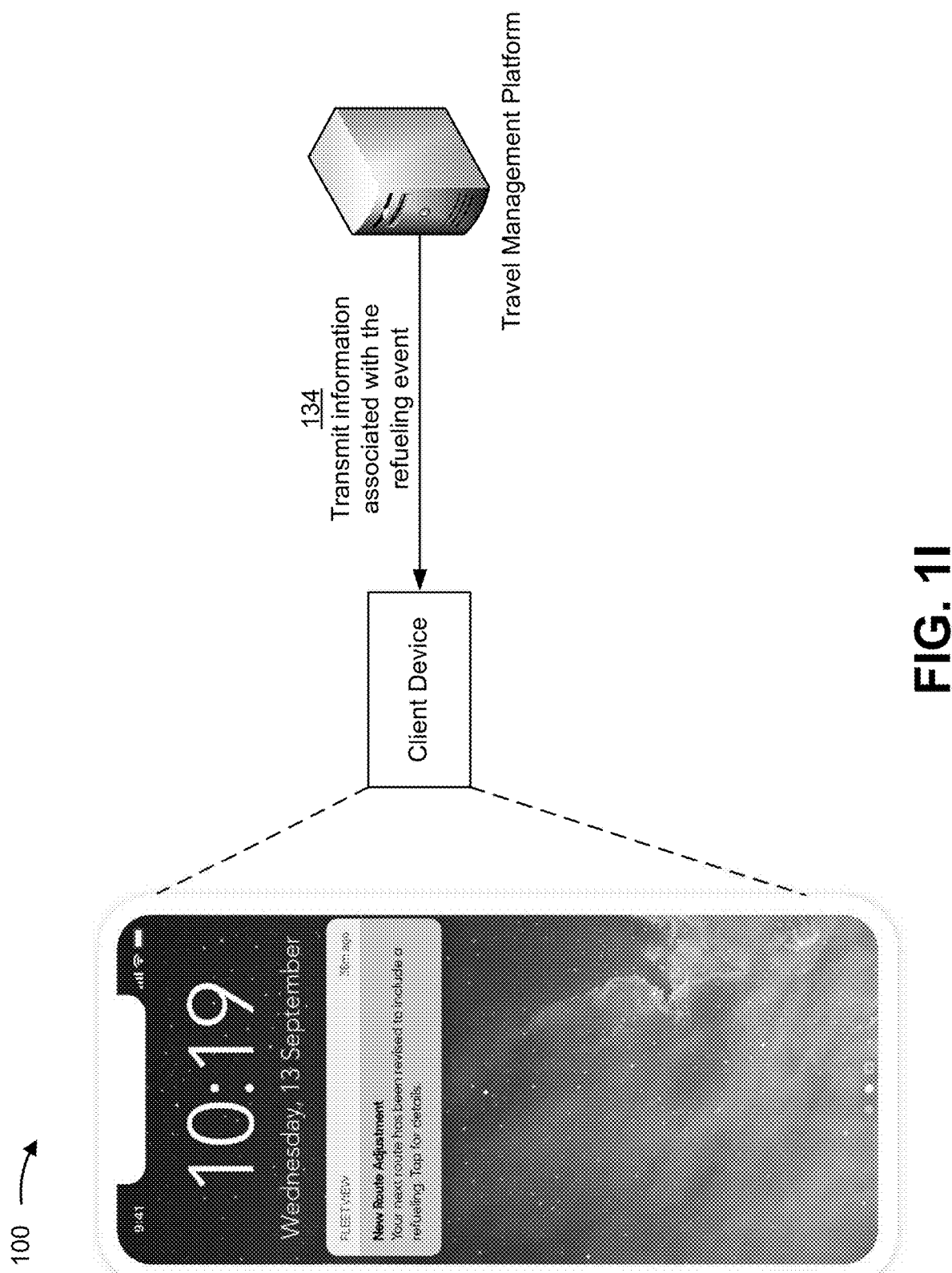

As shown in FIG. 1I, and by reference number 134, the travel management platform can further transmit, to a client device associated with the vehicle, information associated with the refueling event. The information associated with the refueling event can be displayed on a home screen of the client device, can be displayed in a GUI on the client device, and/or the like. In some implementations, the information associated with the refueling event can include an information identifying that the refueling station, associated with the offer for the refueling event, has been added to the route, can include information identifying the refueling station (e.g., the name of the refueling station, an address of the refueling station, and/or the like), can include a price per unit of fuel that was negotiated for the refueling event, and/or the like.

In this way, the travel management platform can determine a refueling event, for a vehicle along a route, and can indicate fuel demand, for the vehicle, to a plurality of refueling stations near the refueling event. The travel management platform can automatically negotiate with the plurality of refueling stations for offers for the refueling event. The travel management platform can securely manage the process of obtaining the offers for the refueling event by orchestrating the process via a distributed ledger or blockchain. In this way, the travel management platform reduces the amount of wasted computing resources and networking resources in obtaining the offers for the refueling event by eliminating the need for the user to search through multiple websites and/or applications to find which refueling stations offer the correct type of fuel for the vehicle, which refueling stations offer the best fuel prices, and which refueling stations offer other amenities that the user can want to take advantage of, which refueling stations can accommodate the type of vehicle, and/or the like. As millions of vehicles become managed by the travel management platform, the computing resource, memory resource, and networking resource savings becomes significant.

As indicated above, FIGS. 1A-1I are provided as an example. Other examples can differ from what is described with regard to FIGS. 1A-1I.

Figure 2:
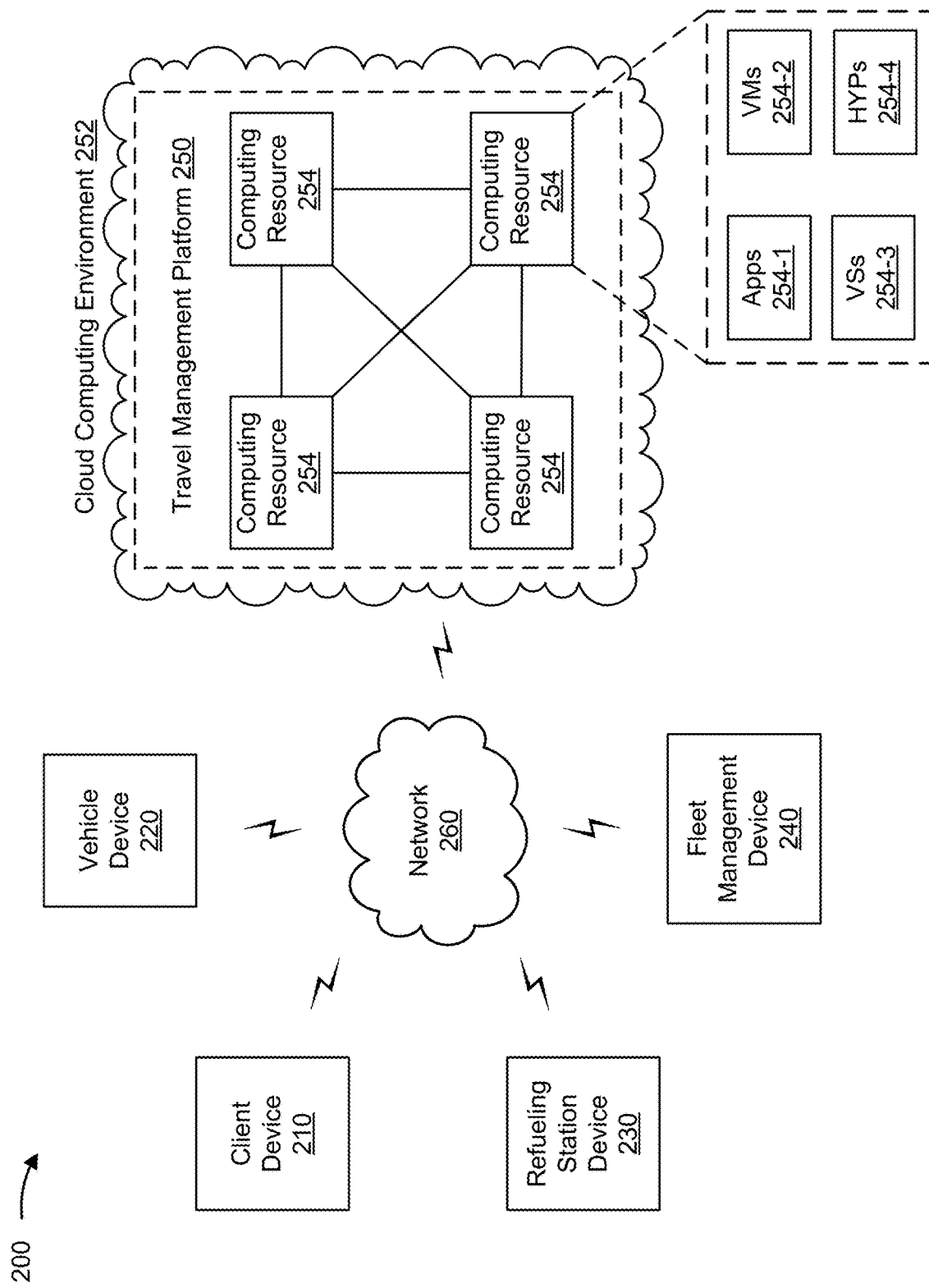
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a client device 210, a vehicle device 220, a refueling station device 230, a fleet management device 240, a travel management platform 250 that includes one or more cloud computing resources 254, and a network 260. Devices of environment 200 can interconnect via wired connections, wireless connections, or a combination of wired and wireless connections.

Client device 210 includes one or more devices capable of receiving, generating, storing, processing, and/or providing information associated with smart refueling event management. For example, client device 210 can include a mobile phone (e.g., a smart phone, etc.), a laptop computer, a tablet computer, a wearable communication device (e.g., a smart wristwatch, a pair of smart eyeglasses, etc.), or a similar type of device.

In some implementations, client device 210 can determine a location of client device 210, can determine a route (e.g., from the location of the client device or another location to a destination location), and/or the like. In some implementations, client device 210 can provide information to travel management platform 250, such as location information (e.g., that identifies the location of client device 210), route information (e.g., that identifies the route), and/or the like. In some implementations, client device 210 can display information, notifications, and/or the like, associated with a refueling event, such as a notification that a refueling event is needed for a vehicle to reach a destination location, information associated with an offer for the refueling event, payment information for the refueling event, and/or the like.

Vehicle device 220 includes one or more devices capable of receiving, generating, storing, processing, and/or providing information associated with smart refueling event management. For example, vehicle device 220 can include a mobile phone (e.g., a smart phone, etc.), a laptop computer, a tablet computer, a wearable communication device (e.g., a smart wristwatch, a pair of smart eyeglasses, etc.), an ODB device (e.g., an ODB-II device and/or a similar type of ODB device), and/or a similar type of device.

In some implementations, vehicle device 220 can be associated with a vehicle. In some implementations, vehicle device 220 can generate vehicle information associated with the vehicle. In some implementations, the vehicle information can include various types of vehicle information, as described above in reference to FIGS. 1A-1I. In some implementations, vehicle device 220 can store the vehicle information in a distributed ledger and/or transmit the vehicle information to client device 210, travel management platform 250, and/or the like. In some implementations, vehicle device 220 can receive instructions (e.g., from client device 210, fleet management device 240, travel management platform 250, and/or the like), such as autonomous navigation instructions. Vehicle device 220 can cause the vehicle to be autonomously navigated to a particular destination location, such as a refueling station and/or another destination location, based on the autonomous navigation instructions.

Refueling station device 230 includes one or more devices capable of receiving, generating, storing, processing, and/or providing information associated with smart refueling event management. For example, refueling station device 230 can include a mobile phone (e.g., a smart phone, etc.), a laptop computer, a tablet computer, a wearable communication device (e.g., a smart wristwatch, a pair of smart eyeglasses, etc.), or a similar type of device.

In some implementations, refueling station device 230 can receive and/or access information associated with a refueling event, such as one or more parameters for the refueling event. In some implementations, refueling station device 230 can receive the one or more parameters from client device 210, refueling station device 230, fleet management device 240, travel management platform 250, and/or the like. In some implementations, refueling station device 230 can access and/or obtain the one or more parameters from a distributed ledger. In some implementations, refueling station device 230 can generate an offer for the refueling event (e.g., based on the one or more parameters). In some implementations, refueling station device 230 can store information associated with the offer for the refueling event in the distributed ledger, can transmit the information associated with the offer to client device 210, refueling station device 230, fleet management device 240, and/or travel management platform 250, and/or the like.

Fleet management device 240 includes one or more devices capable of receiving, generating, storing, processing, and/or providing information associated with smart refueling event management. For example, fleet management device 240 can include a mobile phone (e.g., a smart phone, etc.), a laptop computer, a tablet computer, a wearable communication device (e.g., a smart wristwatch, a pair of smart eyeglasses, etc.), or a similar type of device.

In some implementations, fleet management device 240 can display a (GUI) to display information associated with a plurality of vehicles included in a vehicle fleet. In some implementations, fleet management device 240 can receive inputs via the GUI, such as an input to view various types of fleet information (e.g., any of the fleet information described above in reference to FIGS. 1A-1I), an input to provide navigation instructions to client device 210 and/or vehicle device 220, an input to generate a refueling event, and/or the like.

Travel management platform 250 includes one or more computing resources assigned to smart refueling event management. For example, travel management platform 250 can be a platform implemented by cloud computing environment 252 that can receive the location information, the route information, the vehicle information, and/or the like; can determine a refueling event associated with the vehicle, can provide the one or more parameters for the refueling event (e.g., to a plurality of refueling station devices 230, to a distributed ledger, and/or the like); can receive and/or obtain a plurality of offers for the refueling event (e.g., from the plurality of refueling station devices 230, from the distributed ledger, and/or the like); can provide instructions and/or information for display by client device 210 and/or fleet management device 240; can provide autonomous navigation instructions to vehicle device 220; and/or the like. In some implementations, travel management platform 250 is implemented by computing resources 254 of cloud computing environment 252.

Travel management platform 250 can include a server device or a group of server devices. In some implementations, travel management platform 250 can be hosted in cloud computing environment 252. Notably, while implementations described herein describe travel management platform 250 as being hosted in cloud computing environment 252, in some implementations, travel management platform 250 can not be cloud-based or can be partially cloud-based.

Cloud computing environment 252 includes an environment that delivers computing as a service, whereby shared resources, services, etc. can be provided to travel management platform 250. Cloud computing environment 252 can provide computation, software, data access, storage, and/or other services that do not require end-user knowledge of a physical location and configuration of a system and/or a device that delivers the services. As shown, cloud computing environment 252 can include travel management platform 250 and computing resource 254.

Computing resource 254 includes one or more personal computers, workstation computers, server devices, or another type of computation and/or communication device. In some implementations, computing resource 254 can host travel management platform 250. The cloud resources can include compute instances executing in computing resource 254, storage devices provided in computing resource 254, data transfer devices provided by computing resource 254, etc. In some implementations, computing resource 254 can communicate with other computing resources 254 via wired connections, wireless connections, or a combination of wired and wireless connections.

As further shown in FIG. 2, computing resource 254 can include a group of cloud resources, such as one or more applications ("APPs") 254-1, one or more virtual machines ("VMs") 254-2, virtualized storage ("VSs") 254-3, one or more hypervisors ("HYPs") 254-4, or the like.

Application 254-1 includes one or more software applications that can be provided to or accessed by client device 210, vehicle device 220, refueling station device 230, fleet management device 240, and/or the like. Application 254-1 can eliminate a need to install and execute the software applications on client device 210, vehicle device 220, refueling station device 230, and/or fleet management device 240. For example, application 254-1 can include software associated with travel management platform 250 and/or any other software capable of being provided via cloud computing environment 252. In some implementations, one application 254-1 can send/receive information to/from one or more other applications 254-1, via virtual machine 254-2.

Virtual machine 254-2 includes a software implementation of a machine (e.g., a computer) that executes programs like a physical machine. Virtual machine 254-2 can be either a system virtual machine or a process virtual machine, depending upon use and degree of correspondence to any real machine by virtual machine 254-2. A system virtual machine can provide a complete system platform that supports execution of a complete operating system ("OS"). A process virtual machine can execute a single program, and can support a single process. In some implementations, virtual machine 254-2 can execute on behalf of a user (e.g., a user of client device 210, refueling station device 230, fleet management device 240, and/or the like), and can manage infrastructure of cloud computing environment 252, such as data management, synchronization, or long-duration data transfers.

Virtualized storage 254-3 includes one or more storage systems and/or one or more devices that use virtualization techniques within the storage systems or devices of computing resource 254. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 254-4 provides hardware virtualization techniques that allow multiple operating systems (e.g., "guest operating systems") to execute concurrently on a host computer, such as computing resource 254. Hypervisor 254-4 can present a virtual operating platform to the guest operating systems, and can manage the execution of the guest operating systems. Multiple instances of a variety of operating systems can share virtualized hardware resources.

Network 260 includes one or more wired and/or wireless networks. For example, network 260 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
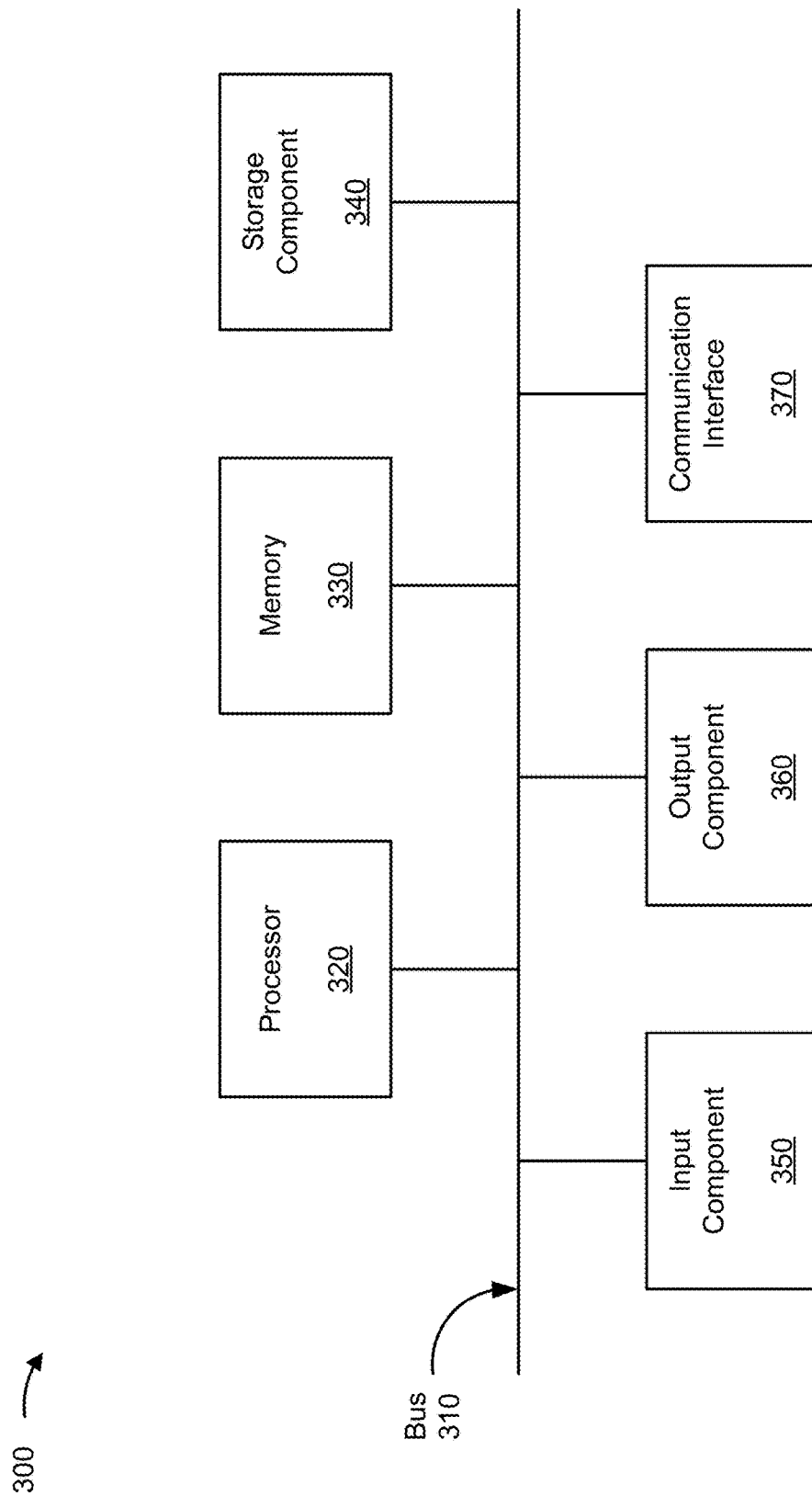
FIG. 3 is a diagram of example components of one or more devices of FIG. 2.

FIG. 3 is a diagram of example components of a device 300. Device 300 can correspond to client device 210, vehicle device 220, refueling station 230, fleet management device 240, travel management platform 250, computing resource 254, and/or one or more devices included network 260. In some implementations client device 210, vehicle device 220, refueling station 230, fleet management device 240, travel management platform 250, computing resource 254, and/or one or more devices included network 260 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
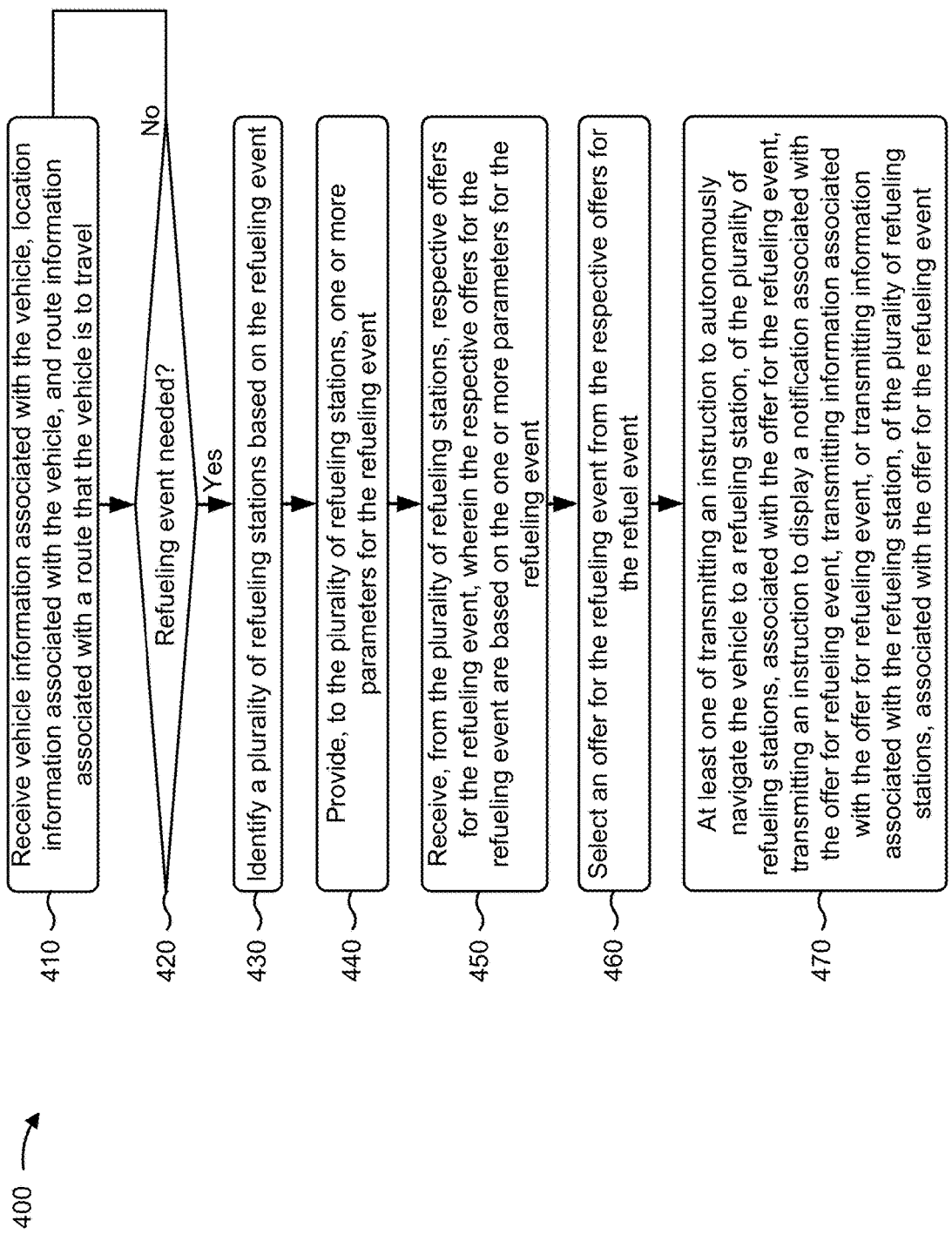
FIG. 4 is a flow chart of an example process for smart refueling event management.

FIG. 4 is a flow chart of an example process 400 for smart refueling event management. In some implementations, one or more process blocks of FIG. 4 can be performed by a travel management platform (e.g., travel management platform 250). In some implementations, one or more process blocks of FIG. 4 can be performed by another device or a group of devices separate from or including travel management platform, such as a client device (e.g., client device 210), a vehicle device (e.g., vehicle device 220), a refueling station device (e.g., refueling station device 230), a fleet management device (e.g., fleet management device 240), and/or another device.

As shown in FIG. 4, process 400 can include receiving vehicle information associated with a vehicle, location information associated with the vehicle, and route information associated with a route that the vehicle is to travel (block 410). For example, the travel management platform (e.g., using processor 320, memory 330, storage component 340, input component 350, output component 360, communication interface 370, and/or the like) can receive vehicle information associated with a vehicle, location information associated with the vehicle, and route information associated with a route that the vehicle is to travel, as described above.

As further shown in FIG. 4, process 400 can include determining whether a refueling event is needed (block 420). For example, the travel management platform (e.g., using processor 320, memory 330, storage component 340, input component 350, output component 360, communication interface 370, and/or the like) can determine whether a refueling event is needed, as described above. In some implementations, the travel management platform can determine whether the refueling event is needed based on the vehicle information associated with the vehicle, the location information associated with the vehicle, and/or the route information associated with a route that the vehicle is to travel. In some implementations, if the travel management platform determines that the refueling event is not needed (block 420—No), process 400 can return to block 410, where the travel management platform can continue to receive vehicle information, location information, and route information.

As further shown in FIG. 4, if the travel management platform determines that the refueling event is needed (block 420—Yes), process 400 can include identifying a plurality of refueling stations based on the refueling event (block 430). For example, the travel management platform (e.g., using processor 320, memory 330, storage component 340, input component 350, output component 360, communication interface 370, and/or the like) can identify a plurality of refueling stations based on the refueling event, as described above.

As further shown in FIG. 4, process 400 can include providing, to the plurality of refueling stations, one or more parameters for the refueling event (block 440). For example, the travel management platform (e.g., using processor 320, memory 330, storage component 340, input component 350, output component 360, communication interface 370, and/or the like) can provide, to the plurality of refueling stations, one or more parameters for the refueling event, as described above.

As further shown in FIG. 4, process 400 can include receiving, from the plurality of refueling stations, respective offers for the refueling event, wherein the respective offers for the refueling event are based on the one or more parameters for the refueling event (block 450). For example, the travel management platform (e.g., using processor 320, memory 330, storage component 340, input component 350, output component 360, communication interface 370, and/or the like) can receive, from the plurality of refueling stations, respective offers for the refueling event, as described above. In some implementations, the respective offers for the refueling event are based on the one or more parameters for the refueling event.

As further shown in FIG. 4, process 400 can include selecting an offer for the refueling event from the respective offers for the refueling event (block 460). For example, the travel management platform (e.g., using processor 320, memory 330, storage component 340, input component 350, output component 360, communication interface 370, and/or the like) can select an offer for the refueling event from the respective offers for the refueling event, as described above.

As further shown in FIG. 4, process 400 can include at least one of transmitting an instruction to autonomously navigate the vehicle to a refueling station, of the plurality of refueling stations, associated with the offer for the refueling event, transmitting an instruction to display a notification associated with the offer for refueling event, transmitting information associated with the offer for refueling event, or transmitting information associated with the refueling station, of the plurality of refueling stations, associated with the offer for the refueling event (block 470). For example, the travel management platform (e.g., using processor 320, memory 330, storage component 340, input component 350, output component 360, communication interface 370, and/or the like) can at least one of transmit an instruction to autonomously navigate the vehicle to a refueling station, of the plurality of refueling stations, associated with the offer for the refueling event, transmit an instruction to display a notification associated with the offer for refueling event, transmit information associated with the offer for refueling event, or transmit information associated with the refueling station, of the plurality of refueling stations, associated with the offer for the refueling event, as described above.

Process 400 can include additional implementations, such as any single implementation or any combination of implementations described below and/or in connection with one or more other processes described elsewhere herein.

In some implementations, process 400 can include receiving, from an on-board diagnostic (ODB) device associated with the vehicle, the vehicle information associated with the vehicle. In some implementations, the vehicle information comprises at least one of information identifying a fuel type associated with the vehicle, information identifying a fuel capacity of the vehicle, information identifying a fuel range of the vehicle, information identifying a fuel level of the vehicle, or information identifying a fuel usage of the vehicle. In some implementations, process 400 can include receiving, from a client device, the location information associated with the vehicle. In some implementations, process 400 can include receiving, from the client device, the route information associated with a route that the vehicle is to travel.

In some implementations, the one or more parameters for the refueling event comprises at least one of a fuel type associated with the vehicle, an amount of fuel that is expected to be purchased as part of the refueling event, one or more user preferences, refueling station rewards information, fleet information associated with the vehicle, a time window in which the refueling event is expected to occur, or a quantity of other refueling events, along the route that the vehicle is to travel, that is estimated for the vehicle. In some implementations, process 400 can include storing, in a distributed ledger, information associated with the offer for the refueling event, determining that the refueling event has been completed, and storing, in the distributed ledger, information associated with the refueling event.

In some implementations, process 400 can include determining that the vehicle is located within a threshold distance of the refueling station associated with the offer for the refueling event and transmitting, based on determining that the vehicle is located within the threshold distance of the refueling station associated with the offer for the refueling event, an instruction to display payment information associated with the offer for refueling event. In some implementations, selecting the offer for the refueling event from the respective offers for the refueling event comprises selecting the offer for the refueling event based on at least one of receiving an input to select the offer for the refueling event, or determining that the offer for the refueling event satisfies a threshold quantity of the one or more parameters.

In some implementations, process 400 can include transmitting an instruction to display information identifying the vehicle, information identifying the refueling event, information identifying a plurality of other vehicles included in vehicle fleet that includes the vehicle, and information identifying a plurality of other refueling events associated with the plurality of other vehicles.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from an on-board diagnostic (OBD) device associated with a vehicle or a sensor device associated with the vehicle, vehicle information associated with the vehicle,
     wherein the vehicle information is used by the device to determine a refueling event for the vehicle;
   determining, by the device, the refueling event for the vehicle based on at least one of:
     the vehicle information,
     location information associated with the vehicle, or
     route information associated with a route that the vehicle is to travel;
   identifying, by the device, a plurality of refueling stations based on the refueling event;
   providing, by the device and to the plurality of refueling stations, one or more parameters for the refueling event;
   receiving, by the device and from the plurality of refueling stations, respective offers for the refueling event,
     wherein the respective offers for the refueling event are based on the one or more parameters for the refueling event;
   selecting, by the device, an offer for the refueling event from the respective offers for the refueling event;
   performing, by the device, at least one of:
     autonomously navigating the vehicle to a refueling station, of the plurality of refueling stations, associated with the offer for the refueling event,
     displaying a notification associated with the offer for the refueling event,
     transmitting information associated with the offer for the refueling event, or
     transmitting information associated with the refueling station, of the plurality of refueling stations, associated with the offer for the refueling event;
   generating, by the device and based on receiving an indication of acceptance of the offer for the refueling event, a smart contract identifying aspects of the refueling event;
     wherein the smart contract is used for the refueling event at the refueling station, and
     wherein a user is permitted to refuel the vehicle based on verification of an identity of the user and payment information associated with the offer;
   determining, by the device and based on information associated with the refueling event received from a client device and information associated with the refueling event received from a device associated with the refueling station, whether the client device and/or the device associated with the refueling station is a compromised device; and
   performing, by the device and when the client device and/or the device associated with the refueling station is a compromised device, one or more actions.

2. The method of claim 1, wherein the vehicle information comprises at least one of:
   information identifying a fuel type associated with the vehicle,
   information identifying a fuel capacity of the vehicle,
   information identifying a fuel range of the vehicle,
   information identifying a fuel level of the vehicle, or information identifying a fuel usage of the vehicle;
receiving, from the client device, the location information associated with the vehicle; and
receiving, from the client device, the route information associated with the route that the vehicle is to travel.

3. The method of claim 1, wherein throne or more parameters for the refueling event comprises at least one of:
a fuel type associated with the vehicle,
an amount of fuel that is expected to be purchased as part of the refueling event,
one or more user preferences,
refueling station rewards information,
fleet information associated with the vehicle,
a time window in which the refueling event is expected to occur, or
a quantity of other refueling events, along the route that the vehicle is to travel, that is estimated for the vehicle.

4. The method of claim 1, further comprising:
storing, in a distributed ledger, information associated with the offer for the refueling event;
determining that the refueling event has been completed; and
storing, in the distributed ledger, information associated with the refueling event.

5. The method of claim 1, further comprising:
determining that the vehicle is located within a threshold distance of the refueling station associated with the offer for the refueling event; and
transmitting, based on determining that the vehicle is located within the threshold distance of the refueling station associated with the offer for the refueling event, an instruction to display h payment information associated with the offer for the refueling event.

6. The method of claim 1, wherein selecting the offer for the refueling event from the respective offers for the refueling event comprises:
selecting the offer for the refueling event based on at least one of:
receiving an input to select the offer for the refueling event, or
determining that the offer for the refueling event satisfies a threshold quantity of the one or more parameters.

7. The method of claim 1, further comprising:
transmitting an instruction to display:
information identifying the vehicle,
information identifying the refueling event,
information identifying a plurality of other vehicles included in vehicle fleet that includes the vehicle, and
information identifying a plurality of other refueling events associated with the plurality of other vehicles.

8. A device, comprising:
one or more memories; and
one or more processors, communicatively coupled to the one or more memories, to:
receive, from an on-board diagnostic (OBD) device associated with a vehicle or a sensor device associated with the vehicle, vehicle information associated with the vehicle,
wherein the vehicle information is used by the device to determine a refueling event for the vehicle;
determine the refueling event for the vehicle based on at least one of:
the vehicle information,
location information associated with the vehicle, or
route information associated with a route that the vehicle is to travel;
identify a plurality of refueling stations based on the refueling event;
provide, to the plurality of refueling stations, one or more parameters for the refueling event;
receive, from the plurality of refueling stations, respective offers for the refueling event,
wherein the respective offers for the refueling event are based on the one or more parameters for the refueling event;
select an offer for the refueling event from the respective offers for the refueling event;
perform at least one of:
autonomously navigate the vehicle to a refueling station, of the plurality of refueling stations, associated with the offer for the refueling event,
display a notification associated with the offer for the refueling event,
transmit information associated with the offer for the refueling event, or
transmit information associated with the refueling station, of the plurality of refueling stations, associated with the offer for the refueling event;
generate, based on receiving an indication of acceptance of the offer for the refueling event, a smart contract identifying aspects of the refueling event;
wherein the smart contract is used for the refueling event at the refueling station, and
wherein a user is permitted to refuel the vehicle based on verification of an identity of the user and payment information associated with the offer;
determine, based on information associated with the refueling event received from a client device and information associated with the refueling event received from a device associated with the refueling station, whether the client device and/or the device associated with the refueling station is a compromised device; and
perform, when the client device and/or the device associated with the refueling station is a compromised device, one or more actions.

9. The device of claim 8, wherein the vehicle information comprises at least one of:
information identifying a fuel type associated with the vehicle,
information identifying a fuel capacity of the vehicle,
information identifying a fuel range of the vehicle,
information identifying a fuel level of the vehicle, or
information identifying a fuel usage of the vehicle;
receive, from the client device, the location information associated with the vehicle; and
receive, from the client device, the route information associated with the route that the vehicle is to travel.

10. The device of claim 8, wherein the one or more parameters for the refueling event comprises at least one of:
a fuel type associated with the vehicle,
an amount of fuel that is expected to be purchased as part of the refueling event,
one or more user preferences,
refuel station rewards information,
fleet information associated with the vehicle,
a time window in which the refueling event is expected to occur, or
a quantity of other refueling events, along the route that the vehicle is to travel, that is estimated for the vehicle.

11. The device of claim 8, wherein the one or more processors are further to:
- store, in a distributed ledger, information associated with the offer for the refueling event;
- determine that the refueling event has been completed; and
- store, in the distributed ledger, information associated with the refueling event.

12. The device of claim 8, wherein the one or more processors are further to:
- determine that the vehicle is located within a threshold distance of the refueling station associated with the offer for the refueling event; and
- transmit, based on determining that the vehicle is located within the threshold distance of the refueling station associated with the offer for the refueling event, an instruction to display the payment information associated with the offer for the refueling event.

13. The device of claim 8, wherein the one or more processors, when selecting the offer for the refueling event from the respective offers for the refueling event, are to:
- select the offer for the refueling event based on at least one of:
  - receive an input to select the offer for the refueling event, or
  - determine that the offer for the refueling event satisfies a threshold quantity of the one or more parameters.

14. The device of claim 8, wherein the one or more processors are further to:
- transmit an instruction to display:
  - information identifying the vehicle,
  - information identifying the refueling event,
  - information identifying a plurality of other vehicles included in vehicle fleet that includes the vehicle, and
  - information identifying a plurality of other refueling events associated with the plurality of other vehicles.

15. A non-transitory computer-readable medium storing one or more instructions, the one or more instructions comprising:
- one or more instructions that, when executed by one or more processors, cause the one or more processors to:
  - receive, from an on-board diagnostic (OBD) device associated with a vehicle or a sensor device associated with the vehicle, vehicle information associated with the vehicle,
    - wherein the vehicle information is used by the device to determine a refueling event for the vehicle;
  - determine the refueling event for the vehicle based on at least one of:
    - the vehicle information,
    - location information associated with the vehicle, or
    - route information associated with a route that the vehicle is to travel;
  - identify a plurality of refueling stations based on the refueling event;
  - provide, to the plurality of refueling stations, one or more parameters for the refueling event;
  - receive, from the plurality of refueling stations, respective offers for the refueling event,
    - wherein the respective offers for the refueling event are based on the one or more parameters for the refueling event;
  - select an offer for the refueling event from the respective offers for the refueling event;
  - perform at least one of:
    - autonomously navigate the vehicle to a refueling station, of the plurality of refueling stations, associated with the offer for the refueling event,
    - display a notification associated with the offer for the refueling event,
    - transmit information associated with the offer for the refueling event, or
    - transmit information associated with the refueling station, of the plurality of refueling stations, associated with the offer for the refueling event;
  - generate, based on receiving an indication of acceptance of the offer for the refueling event, a smart contract identifying aspects of the refueling event;
    - wherein the smart contract is used for the refueling event at the refueling station, and
    - wherein a user is permitted to refuel the vehicle based on verification of an identity of the user and payment information associated with the offer;
  - determine, based on information associated with the refueling event received from a client device and information associated with the refueling event received from a device associated with the refueling station, whether the client device and/or the device associated with the refueling station is a compromised device; and
  - perform, when the client device and/or the device associated with the refueling station is a compromised device, one or more actions.

16. The non-transitory computer-readable medium of claim 15, wherein the vehicle information comprises at least one of:
- information identifying a fuel type associated with the vehicle,
- information identifying a fuel capacity of the vehicle,
- information identifying a fuel range of the vehicle,
- information identifying a fuel level of the vehicle, or
- information identifying a fuel usage of the vehicle;
- receive, from the client device, the location information associated with the vehicle; and
- receive, from the client device, the route information associated with the route that the vehicle is to travel.

17. The non-transitory computer-readable medium of claim 15, wherein one or more parameters for the refueling event comprises at least one of:
- a fuel type associated with the vehicle,
- an amount of fuel that is expected to be purchased as part of the refueling event,
- one or more user preferences,
- refuel station rewards information,
- fleet information associated with the vehicle,
- a time window in which the refueling event is expected to occur, or
- a quantity of other refueling events, along the route that the vehicle is to travel, that is estimated for the vehicle.

18. The non-transitory computer-readable medium of claim 15, wherein the one or more instructions, when executed by the one or more processors, further cause the one or more processors to:
- store, in a distributed ledger, information associated with the offer for the refueling event;
- determine that the refueling event has been completed; and
- store, in the distributed ledger, information associated with the refueling event.

19. The non-transitory computer-readable medium of claim 15, wherein the one or more instructions, when executed by the one or more processors, further cause the one or more processors to:
- determine that the vehicle is located within a threshold distance of the refueling station associated with the offer for the refueling event; and
- transmit, based on determining that the vehicle is located within the threshold distance of the refueling station associated with the offer for the refueling event, an instruction to display the payment information associated with the offer for the refueling event.

20. The non-transitory computer-readable medium of claim 15, wherein the one or more instructions, that cause the one or more processors to select the offer for the refueling event from the respective offers for the refueling event, cause the one or more processors to:
- select the offer for the refueling event based on at least one of:
  - receive an input to select the offer for the refueling event, or
  - determine that the offer for the refueling event satisfies a threshold quantity of the one or more parameters.

* * * * *